US012697972B2

(12) United States Patent
Fox-Rabinovitz et al.

(10) Patent No.: US 12,697,972 B2
(45) Date of Patent: Aug. 4, 2026

(54) SYSTEMS AND METHODS FOR GUIDING AUTONOMOUS VEHICLES WITHIN A TRANSPORT HUB

(71) Applicant: Torc Robotics, Inc., Blacksburg, VA (US)

(72) Inventors: Joseph R. Fox-Rabinovitz, Blacksburg, VA (US); Pablo Smith, Blacksburg, VA (US); William Davis, Blacksburg, VA (US); Akshay Pai Raikar, Blacksburg, VA (US); Mihir Deshingkar, Blacksburg, VA (US); Justin Yurkanin, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 204 days.

(21) Appl. No.: 18/543,424

(22) Filed: Dec. 18, 2023

(65) Prior Publication Data

US 2025/0196859 A1 Jun. 19, 2025

(51) Int. Cl.
B60W 30/165 (2020.01)
B60W 60/00 (2020.01)

(52) U.S. Cl.
CPC ...... B60W 30/165 (2013.01); B60W 60/0027 (2020.02); B60W 2554/4042 (2020.02);
(Continued)

(58) Field of Classification Search
CPC ........... B60W 30/165; B60W 60/0027; B60W 2554/4042; B60W 2756/10; B60W 2554/4044; B60W 2556/65; B60W 2554/802; B60W 2554/4045; B60W 30/12; B60W 30/16; B60W 30/162; B60W 30/17; B60W 30/182; B60W 50/082; B60W 2554/00; B60W 2554/80; B60K 28/00–165; B60K 2028/003; B60K 2028/006; B60K 28/02; B60K 28/04;
(Continued)

(56) References Cited

U.S. PATENT DOCUMENTS 6,151,539 A * 11/2000 Bergholz .............. G01S 15/931
701/472
8,229,618 B2 7/2012 Tolstedt et al.
(Continued)

*Primary Examiner* — Manglesh M Patel
(74) *Attorney, Agent, or Firm* — Armstrong Teasdale LLP

(57) ABSTRACT

Systems and methods for guiding an autonomous vehicle through known and unknown environments by following a remote vehicle are disclosed. An autonomous vehicle in accordance with the present disclosure comprises a computing system including a processor, a memory device, and at least one sensor configured to receive signals from a remote vehicle. The processor is programmed to receive a message to follow a remote vehicle, the follow instruction message including at least one identifier. The processor is further programmed to detect the remote vehicle, confirm the identity of the remote vehicle using the at least one identifier, and then establish a communication link with the remote vehicle. Once the at least one processor determines that the remote vehicle is aligned with the autonomous vehicle, the at least one processor may transmit one or more instructions which cause the autonomous vehicle to follow the remote vehicle.

20 Claims, 7 Drawing Sheets

(52) U.S. Cl.
CPC .............. *B60W 2554/4044* (2020.02); *B60W 2554/4045* (2020.02); *B60W 2554/802* (2020.02); *B60W 2556/65* (2020.02); *B60W 2756/10* (2020.02)

(58) Field of Classification Search
CPC .... B60K 28/06; B60K 28/063; B60K 28/066; B60K 28/08; B60K 28/10; B60K 28/12; B60K 28/14; B60K 28/16; G05D 1/0061; G05D 1/0088; G05D 1/021; G05D 1/0214; G05D 1/0221; G05D 1/0223
USPC .......................................................... 701/2
See application file for complete search history.

(56) References Cited

U.S. PATENT DOCUMENTS

| | | | |
|---|---|---|---|
| 8,510,029 B2 | 8/2013 | Curtis et al. | |
| 8,583,317 B2 * | 11/2013 | Nishida | H04L 9/3226 |
| | | | 701/29.6 |
| 8,995,662 B2 * | 3/2015 | Rubin | H04L 5/0091 |
| | | | 380/255 |
| 9,165,470 B2 | 10/2015 | Mudalige et al. | |
| 9,187,095 B2 | 11/2015 | Gerdt | |
| 9,189,961 B2 | 11/2015 | Mehr et al. | |
| 9,224,300 B2 | 12/2015 | Lee et al. | |
| 9,449,515 B2 * | 9/2016 | Rubin | G08G 1/0969 |
| 9,494,943 B2 | 11/2016 | Harvey | |
| 9,582,006 B2 | 2/2017 | Switkes et al. | |
| 10,380,898 B1 * | 8/2019 | Schubert | G06Q 10/02 |
| 11,009,868 B2 | 5/2021 | Ferguson et al. | |
| 11,194,350 B2 * | 12/2021 | Nambiar | G06V 40/28 |
| 11,803,266 B2 * | 10/2023 | Park | G06F 3/0416 |
| 11,840,266 B2 * | 12/2023 | Woodrow | G05D 1/028 |
| 2005/0088318 A1 * | 4/2005 | Liu | G08G 1/0965 |
| | | | 340/995.13 |
| 2008/0059007 A1 | 3/2008 | Whittaker et al. | |
| 2013/0231829 A1 * | 9/2013 | Gerdt | B60W 10/04 |
| | | | 701/41 |
| 2013/0279491 A1 * | 10/2013 | Rubin | G08G 1/162 |
| | | | 370/347 |
| 2014/0070980 A1 * | 3/2014 | Park | G01S 13/86 |
| | | | 342/118 |
| 2016/0054735 A1 * | 2/2016 | Switkes | G05D 1/0217 |
| | | | 701/23 |
| 2017/0132477 A1 * | 5/2017 | Kim | G08G 1/096716 |
| 2017/0359365 A1 * | 12/2017 | van den Berg | H04W 4/20 |
| 2018/0211546 A1 * | 7/2018 | Smartt | H04W 4/023 |
| 2018/0275676 A1 | 9/2018 | Justice | |
| 2019/0039616 A1 | 2/2019 | Leff Yaffe et al. | |
| 2019/0061756 A1 | 2/2019 | Adam et al. | |
| 2019/0068582 A1 * | 2/2019 | Kim | G07C 5/008 |
| 2019/0251848 A1 * | 8/2019 | Sivanesan | H04W 4/08 |
| 2020/0005650 A1 | 1/2020 | Park | |
| 2020/0057453 A1 * | 2/2020 | Laws | G08G 1/22 |
| 2020/0264634 A1 | 8/2020 | Hadi et al. | |
| 2020/0312134 A1 * | 10/2020 | Zhang | G08G 1/0141 |
| 2020/0314952 A1 * | 10/2020 | Jornod | G08G 1/22 |
| 2021/0072768 A1 | 3/2021 | Fendt | |
| 2021/0074090 A1 * | 3/2021 | Neumann, Jr. | G07C 1/22 |
| 2021/0129843 A1 | 5/2021 | George et al. | |
| 2021/0264794 A1 | 8/2021 | Merwaday et al. | |
| 2021/0327280 A1 | 10/2021 | Choi et al. | |
| 2021/0350709 A1 | 11/2021 | Li et al. | |
| 2021/0358308 A1 | 11/2021 | Li et al. | |
| 2022/0180281 A1 | 6/2022 | Walton | |
| 2022/0369083 A1 * | 11/2022 | Goel | G08G 1/22 |
| 2023/0007478 A1 * | 1/2023 | Chen | H04W 64/00 |
| 2023/0156837 A1 * | 5/2023 | Hwang | H04W 84/04 |
| | | | 370/329 |
| 2023/0266145 A1 * | 8/2023 | Salter | G01C 21/387 |
| | | | 701/532 |
| 2023/0413022 A1 * | 12/2023 | Tran | G06K 19/025 |
| 2024/0262392 A1 * | 8/2024 | Kan | B60W 60/0027 |

* cited by examiner

SYSTEMS AND METHODS FOR GUIDING AUTONOMOUS VEHICLES WITHIN A TRANSPORT HUB

TECHNICAL FIELD

The field of the disclosure relates generally to autonomous vehicles and, more particularly, to systems and methods for guiding autonomous vehicles through known and unknown environments by following a remote vehicle.

BACKGROUND

An autonomous driving system is any system that is partially or fully capable of driving a vehicle without the aid, assistance, or intervention of a human driver. In 2014, SAE International created the SAE Levels of Driving Automation as a classification system for autonomous vehicles with the goal of providing greater clarity and transparency on the subject of autonomous technology. SAE's classification system consists of five levels of autonomy. At Level 0 Autonomy, the vehicle is incapable of autonomous driving and is controlled solely by a human driver. Level 1 Autonomy is characterized as one aspect of the driving process being taken over in isolation, using data from sensors and cameras, but the driver retaining control of the vehicle. At Level 2 Autonomy, computers take on many of the driver's responsibilities, such as steering, however, a driver always must be present in the vehicle to take control in the event of an emergency and must keep a continual eye on the system. At Level 3 Autonomy, all aspects of driving are handled by the autonomous driving system, but the driver must be present at all times in case an intervention request is made. At Level 4 Autonomy, the autonomous driving system is capable of driving fully autonomously in proper settings without the assistance or intervention of a human driver. However, if a driver takes control of the vehicle, the autonomous driving system will disengage. At Level 5 Autonomy, the autonomous driving system is able to drive in known environments and can be navigated by a human driver. At Level 5, the autonomous driving system must be capable of managing all scenarios on its own and executing the entire dynamic driving task.

If an autonomous vehicle capable of Level 3 or 4 Autonomy enters a transport hub, the autonomous driving system may disengage, the vehicle may enter a manual mode, and a human driver may navigate the autonomous vehicle through the transport hub. As discussed in more detail below, it would be advantageous to have systems and methods which allow the autonomous driving system of the vehicle to remain engaged while the vehicle navigates through the transport hub.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a computing system of an autonomous vehicle is disclosed. The computing system includes at least one processor in communication with at least one memory device and at least one sensor configured to receive signals from a remote vehicle. The at least one processor programmed to receive a follow instruction message to follow a remote vehicle, the follow instruction message including at least one identifier of the remote vehicle. The at least one processor is further programmed to detect the presence of the remote vehicle, confirm the identity of the remote vehicle by comparing the at least one identifier included in the follow instruction message with at least one identifier of the remote vehicle, and establish a communication link with the remote vehicle. The at least one processor is further programmed to determine, based on a signal from the remote vehicle, that the remote vehicle is aligned with the autonomous vehicle. In response to determining the remote vehicle is aligned with the autonomous vehicle, the at least one processor is configured to transmit one or more instructions which cause the autonomous vehicle to follow the remote vehicle.

In another aspect, a computer-implemented method for detecting and following a remote vehicle is disclosed. The computer-implemented method is implemented via a computing system of an autonomous vehicle. The computing system includes at least one processor and/or associated transceiver in communication with at least one memory device and at least one sensor. The computer-implemented method comprises receiving a follow instruction message to follow a remote vehicle, the follow instruction message including at least one identifier of the remote vehicle. The computer-implemented method further comprises detecting the presence of the remote vehicle, confirming the identity of the remote vehicle by comparing the at least one identifier included in the follow instruction message with at least one identifier of the remote vehicle, and establish a communication link with the remote vehicle. The computer-implemented method further comprises determining, based on a signal from the remote vehicle, that the remote vehicle is aligned with the autonomous vehicle. In response to determining that the remote vehicle is aligned with the autonomous vehicle, the computer-implemented method comprises transmitting one or more instructions which cause the autonomous vehicle to follow the remote vehicle.

In yet another aspect, a non-transitory computer-readable storage medium having computer-executable instructions embodied thereon, is disclosed. The computer-executable instructions, when executed by at least one processor, cause the at least one processor to receive a follow instruction message to follow a remote vehicle, the follow instruction message including at least one identifier of the remote vehicle. The computer-executable instructions further cause the at least one processor to detect the presence of the remote vehicle, confirm the identity of the remote vehicle by comparing the at least one identifier included in the follow instruction message with at least one identifier of the remote vehicle, and establish a communication link with the remote vehicle. The computer-executable instructions further cause the at least one processor to determine, based on a signal from the remote vehicle, that the remote vehicle is aligned with the autonomous vehicle. In response to determining the remote vehicle is aligned with the autonomous vehicle, the computer-executable instructions cause the at least one processor to transmit one or more instructions which cause the autonomous vehicle to follow the remote vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figures 1A, 1B:
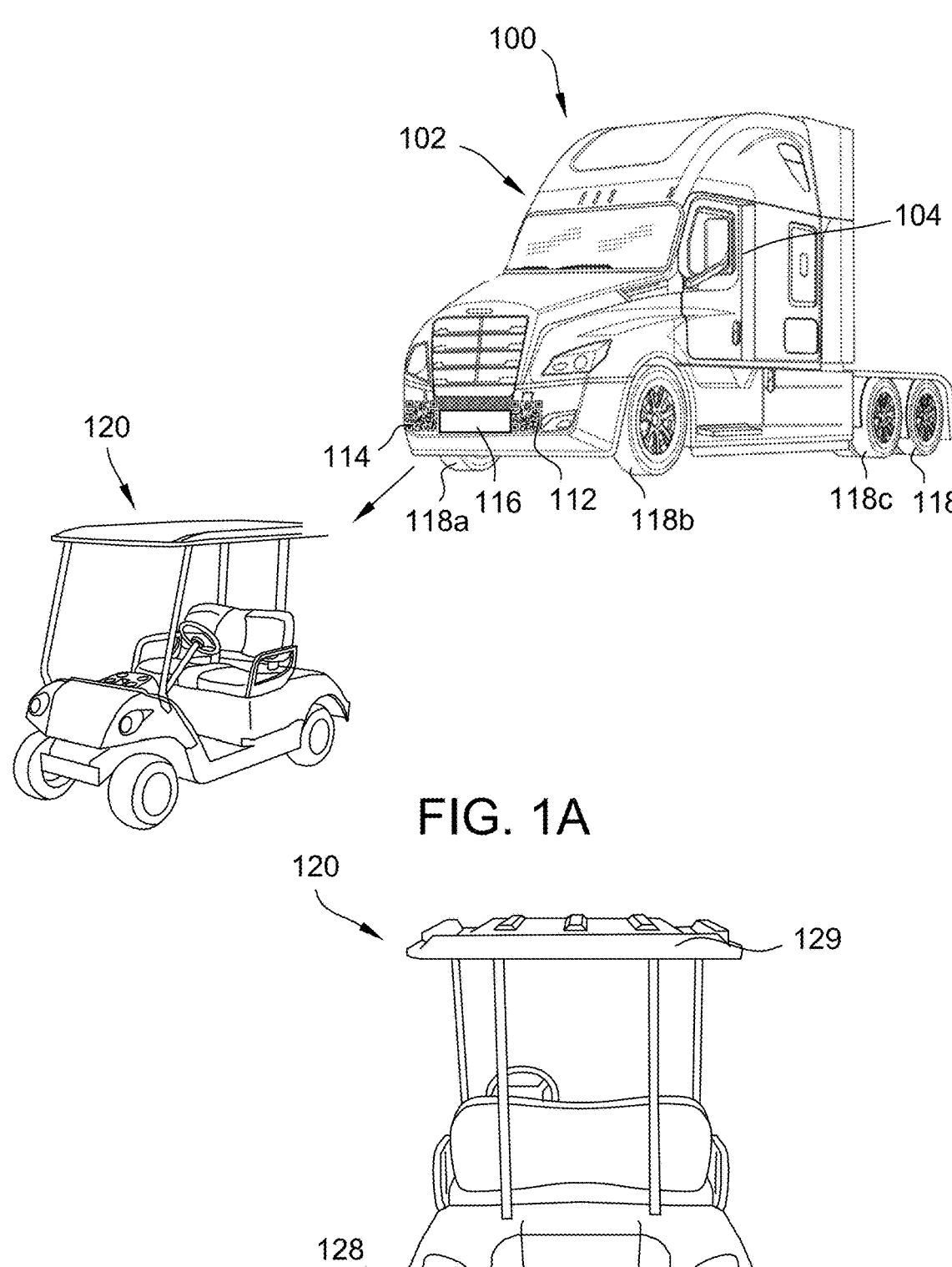
FIG. 1A is a diagram of an autonomous vehicle following a remote vehicle, according to an embodiment of the present disclosure.
FIG. 1B is a rear view of the remote vehicle of FIG. 1A, according to an embodiment of the present disclosure.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing herein shall be deemed to be a limitation upon the overall scope of the present disclosure.

Systems and methods are disclosed herein which enable an autonomous vehicle to be guided through a transport hub or similar area (e.g., a parking lot, service station, and the like) by a remote vehicle. The remote vehicle may comprise a remote-controlled vehicle, an autonomous vehicle specifically trained for the environment, and/or a human operated non-autonomous vehicle. An autonomous vehicle in accordance with the present disclosure may comprise a computing system including at least one processor in communication with at least one memory device and at least one sensor configured to receive signals from a remote vehicle. Upon entering a transport hub, or other area, the at least one processor may receive a follow instruction message from a remote computing device. The remote computing device may be associated with a control center which is responsible for hub operation, including tracking arrivals and departures. The follow instruction message may include instructions to follow a specified remote vehicle. For example, the instruction message may include an identifier (e.g., a license plate number, QR code, etc.) associated with the remote vehicle that the autonomous vehicle should follow. The autonomous vehicle then detects the presence of the remote vehicle and confirms the identity of the remote vehicle using the identifier (e.g., by comparing the at least one identifier included in the follow instruction message with at least one identifier of the remote vehicle). Once the identity of the remote vehicle is confirmed, a communication link is established between the autonomous vehicle and the remote vehicle and the autonomous vehicle and the remote vehicle align with each other. Once the remote vehicle is aligned with the autonomous vehicle, the remote vehicle guides the autonomous vehicle through the hub.

An example technical effect of the methods, systems, and devices described herein includes at least one of: (a) improved navigation through hubs and other areas by autonomous vehicles; (b) improved object detection performance by autonomous vehicles; (c) improved performance of environmental sensing by autonomous vehicles; (d) improved performance of autonomous vehicle maneuvering, routing, or operation more generally; and (e) the ability of autonomous vehicles to remain in full or partial autonomous mode while navigating through a hub or any other unfamiliar or unmapped environment.

In some embodiments, the disclosed systems and methods include a multimodal object detection system employing image data, such as data from one or more cameras and/or one or more light detection and ranging (LiDAR) sensors. In other embodiments, the disclosed systems and methods include a multimodal object detection system employing long-range acoustic beamforming of road noise as a complementary modality with image data (e.g., data from one or more cameras and/or one or more LiDAR sensors). More particularly, in addition to the image data, the disclosed systems and methods may employ long-range acoustic beamforming of sound produced by road users "in-the-wild" as a sensing modality. Autonomous vehicles generate myriad noises produced as a result of engine and transmission operation, aerodynamics, braking, road contact, or synthetic noise (e.g., horns, beeps, alarms, audio). In some embodiments, the disclosed systems and methods employ acoustic sensors (e.g., transducers, microphones) for object detection.

Systems and methods in accordance with the present disclosure may employ an object detection algorithm trained with a long-range acoustic beamforming dataset including sound measurements from one or more planar microphone arrays, one or more LiDAR sensors, one or more cameras, one or more global navigation satellite system (GNSS) receivers, inertial measurement unit (IMU) data, and/or radio detection and ranging (RADAR). The one or more cameras may include, but are not limited to, the following camera types: red-green-blue (RGB), red-clear-clear-blue (RCCB), short-wave infrared (SWIR), mid-wave infrared (MWIR), long-wave infrared (LWIR), hyperspectral and/or neuromorphic.

Systems and methods in accordance with the present disclosure may include an autonomous vehicle comprising one or more sensors. The one or more sensors may comprise a variety of sensors, such as at least one acoustic sensor, for perceiving the environment around the autonomous vehicle. The autonomous vehicle may further comprise one or more computing devices including one or more processors. The one or more computing devices and the plurality of sensors may be used for detecting objects and obstacles in the environment and, in some cases, for determining their relative locations, velocities, and to make judgments about their future states or actions. Environmental perception includes object detection and understanding and may be based at least in part on data collected by acoustic sensors and/or image data collected by, for example, one or more LiDAR sensors, RADAR, sonar, one or more ultrasonic sensors, or one or more cameras, among other suitable active or passive sensors.

Systems and methods in accordance with the present disclosure may include an autonomous vehicle comprising one or more processors or processing systems that execute localization (e.g., a localization system). Localization is the process of determining the precise location of the autonomous vehicle using data received from the one or more sensors and data from other systems, such as a global navigation satellite system (GNSS) receiver. The autonomous vehicle's position, both absolute and relative to other objects in the environment, is used for global and local mission planning, as well as for other auxiliary functions, such as determining expected weather conditions or other environmental considerations based on externally generated data.

Systems and methods in accordance with the present disclosure may include an autonomous vehicle including one or more processors or processing systems that execute behavior, planning, and control (BPC) (e.g., an autonomy system and/or one or more BPC components of an autonomy system). BPC includes planning and implementing one or more behavioral-based trajectories to operate an autonomous vehicle similar to or better than a human driver-based operation. The behavior planning and control system uses inputs from one or more components of an autonomy system, including, but not limited to a localization component, to generate trajectories or other actions that may be selected to follow or enact as the autonomous vehicle travels. Trajectories may be generated based on known appropriate interaction with other static and dynamic objects in the environment (e.g., those indicated by law, custom, or safety). BPC may also include generating local objectives including, for example, lane changes, obeying traffic signs, etc.

FIG. 1A is a diagram of an autonomous vehicle 100 and a remote vehicle 120, according to an embodiment of the present disclosure. FIG. 1B is a rear view of remote vehicle 120. In some embodiments, such as the embodiment illustrated in FIG. 1A, the autonomous vehicle 100 comprises a truck which may further be conventionally connected to a single or tandem trailer (not shown) to transport the trailer to a desired location. In such embodiments, autonomous vehicle 100 includes a tractor 102 that can be supported by, and steered in, the required direction by front wheels 118a, 118b, and rear wheels 118c, 118d that are partially shown in FIG. 1A. In some embodiments, such as the embodiment illustrated in FIG. 1A, tractor 102 includes a cabin 104 where a human driver may sit and manually operate the vehicle. Wheels 118a, 118b are positioned by a steering system that includes a steering wheel (not shown), a steering column (not shown), and a steering gear box (not shown). The steering system is connected to wheels 118a, 118b to suitably control the wheel positions. The steering wheel and the steering column may be located in the interior of cabin 104 and the steering gear box may be located outside of tractor 102. In embodiments where autonomous vehicle 100 is fully autonomous (e.g., an autonomous vehicle capable of Level 5 Autonomy), tractor 102 does not require a cabin. Further, in such embodiments where autonomous vehicle 100 is fully autonomous, the steering system does not require the steering wheel and steering column, and may include only the steering gear box.

Remote vehicle 120 may comprise a remote-controlled vehicle (e.g., a radio-controlled (RC) vehicle), an autonomous vehicle specifically trained for the environment, and/or a human-operated non-autonomous vehicle. For example, in some embodiments, remote vehicle 120 may comprise an autonomous or non-autonomous low-speed vehicle (LSV), an autonomous or non-autonomous electric vehicle, or an autonomous or non-autonomous electric LSV. However, the foregoing lists are meant to be merely exemplary and not exhaustive. In the embodiment illustrated in FIGS. 1A and 1B, remote vehicle 120 comprises a golf-cart. Remote vehicle 120 may act as a guide, or "shepherd" for autonomous vehicle 100 through a hub, such as a transport hub. The terms "remote vehicle" and "shepherd vehicle" are used interchangeably throughout the disclosure. Further, although the disclosure describes remote vehicle 120 as guiding autonomous vehicle 100 through a transport hub, remote vehicle 120 may be used to guide autonomous vehicles through any center of activity, such as a parking lot, service station, and the like. Additionally, or alternatively, remote vehicle 120 may be used to guide autonomous vehicle 100 to a path known to the remote vehicle but unfamiliar to the autonomous vehicle, a nearby hub, and/or a repair facility when autonomous vehicle 100 is lost and/or partially disabled.

Figure 2:
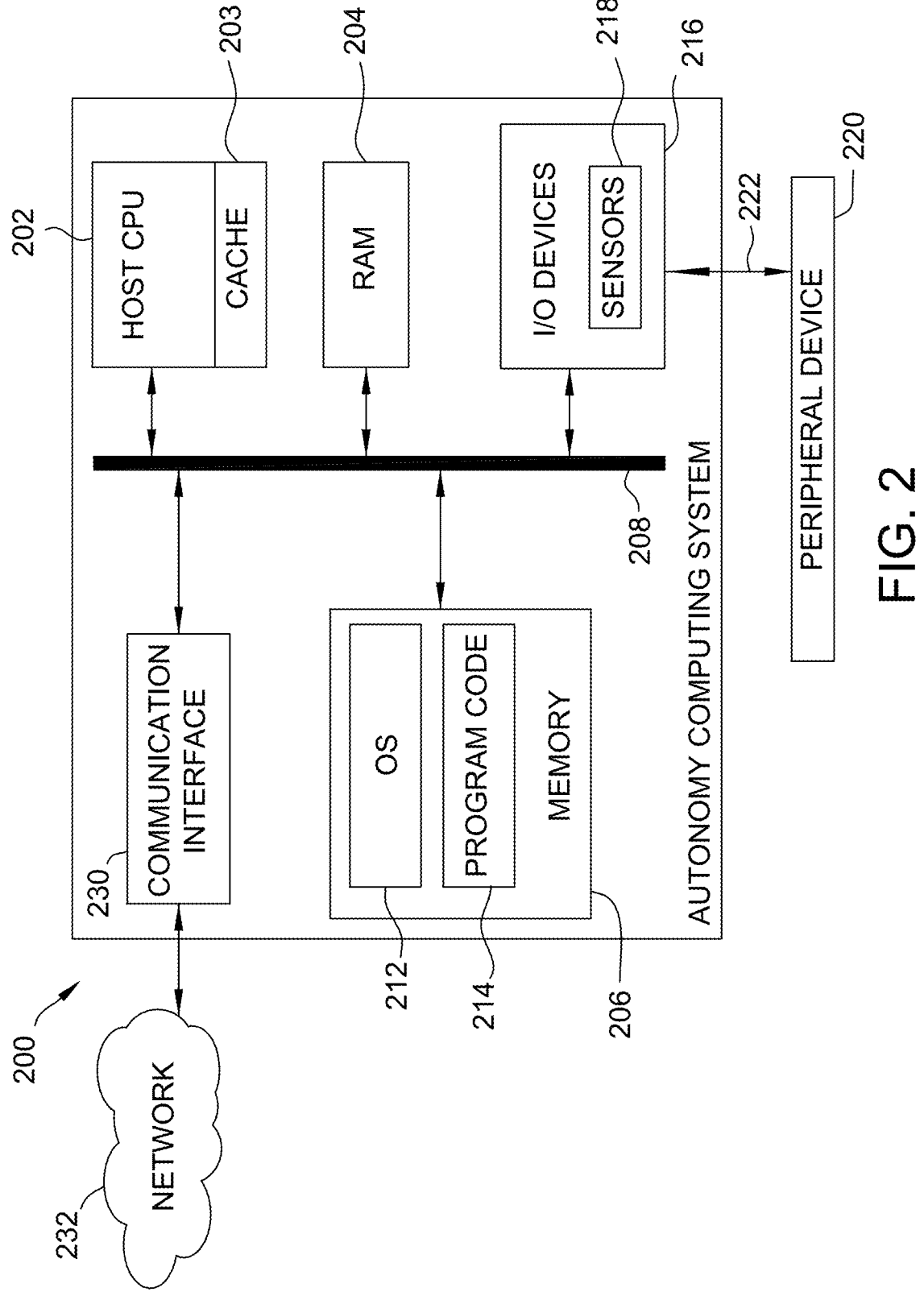
FIG. 2 is a block diagram of an autonomy computing system for autonomous vehicles, according to an embodiment of the present disclosure.

FIG. 2 is a block diagram of an exemplary autonomy computing system 200 of an autonomous vehicle (e.g., autonomous vehicle 100 shown in FIG. 1A), according to an embodiment of the disclosure. Autonomy computing system 200 includes at least one central processing unit (CPU) 202 coupled to a cache memory 203, and further coupled to random-access memory (RAM) 204 and memory 206 via a memory bus 208. Cache memory 203 and RAM 204 are configured to operate in combination with CPU 202. Memory 206 is a computer-readable memory (e.g., volatile or non-volatile) that includes at least a memory section storing an operating system (OS) 212 and a section storing program code 214. In alternative embodiments, one or more sections of memory 206 may be omitted and the data stored remotely. For example, in certain embodiments, program code 214 may be stored remotely on a server or mass-storage device, and made available over a network to CPU 202.

Autonomy computing system 200 also includes one or more input/output (I/O) devices 216. The one or more I/O devices 216 may include, for example, a serial channel controller or other suitable interface for controlling a sensor peripheral 218 including one or more passive acoustic sensors, one or more active acoustic sensors, one or more ultrasound sensors, one or more sonar sensors, one or more LiDAR sensors, one or more RADARs, one or more cameras, one or more radio frequency identification (RFID) readers, one or more receivers for any band in the electromagnetic (EM) spectrum, including, but not limited to visible, infrared (IR), ultraviolet (UV), radio, etc., a vehicle bus controller (e.g., a controller area network (CAN) bus controller) for communicating over a communication interface (e.g., a CAN bus), and/or a graphics processing unit (GPU) for operating a display peripheral over a display link and/or performing massively parallelized computations.

In some embodiments, autonomy computing system 200 may also include a communication interface 230 which may be communicatively coupled to one or more remote vehicles (e.g., remote vehicle 120 illustrated in FIGS. 1A and 1B) and/or one or more remote computing devices. Communication interface 230 may include, for example, a wired or wireless network adapter or a wireless data transceiver for use with a network 232, which may comprise, for example, a mobile phone network (e.g., Global System for Mobile communications (GSM), 3G, 4G, 5G, 6G, or Bluetooth) or other mobile data network (e.g., Worldwide Interoperability for Microwave Access (WIMAX)). Additionally, or alternatively, autonomy computing system 200 and remote vehicles and/or devices can communicate over one or more communication networks, such as the Internet through a website maintained by a computer on a remote server or over an online data network including commercial online service providers, Internet service providers, private networks (e.g., local area networks and enterprise networks), and the like (e.g., wide area networks). Additionally, or alternatively, autonomy computing system 200 and remote vehicles and/or devices may communicate through a mobile phone network (e.g., 3G, 4G, 5G, 6G, etc.) and/or using a variety of communication technologies, such as radio frequency (RF) (e.g., wireless fidelity (WiFi®) and Bluetooth®), cable TV, satellite links and the like.

As noted above, I/O devices 216 may comprise one or more cameras. The one or more cameras may be configured to detect one or more features or one or more visual elements of a shepherd vehicle (e.g., remote vehicle 120 shown in FIGS. 1A and 1B). In some embodiments, the one or more visual elements may be reflective or otherwise clearly marked on the shepherd vehicle. In some embodiments, the visual elements may be strategically placed on the shepherd vehicle such that the autonomous vehicle can determine an orientation of the shepherd vehicle based on the angle and position of the one or more visual elements. The one or more visual elements may include, but are not limited to a QR code, license plate, symbol, and/or any other identifying element which is included on the shepherd vehicle, Additionally, or alternatively, the one or more visual elements may include the shape of the chassis and/or the superstructure of the remote vehicle, as discussed in more detail below. In the embodiment illustrated in FIG. 1B, remote vehicle 120 comprises a first QR code 122 positioned on a first side of the rear of remote vehicle 120 and a second QR code 124 positioned on a second side of the rear of remote vehicle 120. The one or more cameras of the autonomous vehicle (e.g., autonomous vehicle 100 shown in FIG. 1A) may detect QR codes 122, 124 and may determine an orientation of remote vehicle based 120 on the position of the QR codes 122, 124. Additionally, or alternatively, the one or more cameras of the autonomous vehicle may determine an identity and/or an orientation of a remote vehicle based on identifying signage on remote vehicle, such as a license plate (e.g., license plate 126 of remote vehicle 120 shown in FIG. 1B). For example, in some embodiments, LiDAR may be used to detect the bumps of license plates. This data may be used to determine the identity and/or orientation of the remote vehicle. Additionally, or alternatively, the one or more visual elements may include one or more features of the vehicle structure. For example, in some embodiments, a shape of the remote vehicle may be used for three-dimensional orientation of autonomous vehicle 100 relative to remote vehicle 120. In some embodiments, the shape of the remote vehicle is well-suited for three-dimensional orientation. For example, in embodiments where the shepherd vehicle is a golf cart, the remote vehicle has a cube-like shape with distinct features on each "face" of the cube. For example, in the embodiment illustrated in FIG. 1B, the autonomous vehicle may use taillights 128 and/or ridged roof 129 to orient itself relative to the remote vehicle.

Additionally, or alternatively, the remote vehicle may comprise one or more cameras configured to detect one or more visual elements of the autonomous vehicle (e.g., QR code, license plate, symbol, and/or any other identifying element). The one or more cameras of the remote vehicle may determine the identity of autonomous vehicle and/or to determine the orientation of the autonomous vehicle using the one or more visual elements of the autonomous vehicle. For example, in the embodiment illustrated in FIG. 1A, autonomous vehicle 100 comprises a first QR code 112 positioned on a first side of the front of autonomous vehicle 100 and a second QR code 114 positioned on a second side of the front of autonomous vehicle 100. The one or more cameras of the remote vehicle (e.g., remote vehicle 120 shown in FIGS. 1A and 1B) may detect QR codes 112, 114 and may determine an orientation of the remote vehicle relative to the autonomous vehicle based on the position of QR codes 112, 114. Additionally, or alternatively, the one or more cameras of the remote vehicle may determine an identity and/or an orientation of an autonomous vehicle based on a license plate of the autonomous vehicle (e.g., license plate 116 of autonomous vehicle 100 shown in FIG. 1A). For example, in some embodiments, LiDAR may be used to detect the bumps of license plates. This data may be used to determine the identity and/or orientation of the autonomous vehicle.

As noted above, I/O devices 216 may comprise one or more RFID readers. In some embodiments, the remote vehicle comprises one or more RFID tags. In some embodiments, the RFID tag is and active RFID tag. The active RFID tag may broadcast a unique radio identifier code which may be received by an RFID reader when the RFID tag is within a predetermined distance of the RFID reader. In some embodiments, the active RFID tag acts a transponder and listens for a request from an RFID reader and transmits the unique identifier to the RFID reader only when prompted (e.g., when the RFID tag is within a predetermined distance of the RFID reader). In other embodiments, the active RFID tag acts a beacon and continuously sends a signal, which may be read by an RFID reader when the RFID tag is within a predetermined distance of the RFID reader. The active RFID tag may be powered by a battery. In some embodiments, the RFID tag is a passive RFID tag, and the RFID reader may comprise one or more antennas which emit radio waves and receive signals back from a passive RFID tag within a predetermined distance of the RFID reader. The passive RFID tag may use radio waves to communicate their unique identifier and other information to nearby RFID readers. Additionally, or alternatively, the autonomous vehicle comprises one or more RFID tags and the remote vehicle comprises an RFID reader so that the remote vehicle may confirm the identity of the autonomous vehicle.

As noted above, I/O devices 216 may include one or more receivers for any band in the EM spectrum, including but not limited to, visible, IR, UV, radio, etc. For example in some embodiments, I/O devices may include one or more IR receivers. In some embodiments, the remote vehicle includes one or more IR transmitters. The one or more IR transmitters are configured to flash an IR light in a particular pattern, which the one or more IR receivers of the autonomous vehicle may receive. The autonomous vehicle translates the sensed IR signals into electronic signals. In this way, the remote vehicle may provide identification and/or instructions to the autonomous vehicle. Additionally, or alternatively, the autonomous vehicle may comprise an IR transmitter and the remote vehicle may comprise an IR receiver so that the autonomous vehicle may provide identification data and/or instructions to the remote vehicle.

In some embodiments, I/O devices 216 may include one or more visible light receivers. In some embodiments, the shepherd vehicle includes one or more visible light transmitters configured to modulate the intensity of emitted light. One or more visible light receivers of the autonomous vehicle may receive light emitted from the one or more visible light transmitters. The autonomous vehicle translates the sensed visible light into electronic signals. In this way, the remote vehicle may provide identification and/or instructions to the autonomous vehicle. Additionally, or alternatively, the autonomous vehicle may comprise a visible light transmitter and the remote vehicle may comprise a visible light receiver so that the autonomous vehicle may provide identification data and/or instructions to the remote vehicle.

As also further above, I/O devices 216 may comprise one or more ultrasound sensors which may provide information about an object's proximity. Further, as also noted above, a mobile phone network (e.g., 3G, 4G, 5G, 6G, etc.) and/or other communication technologies, such as radio frequency (RF) (e.g., wireless fidelity (WiFi®) and Bluetooth®), cable TV, satellite links and the like, may be used for identifying a shepherd vehicle and/or autonomous vehicle and/or determining an orientation of a shepherd vehicle and/or autonomous vehicle.

As noted above, autonomy computing system 200 may be configured to communicate with one or more remote vehicles (e.g., remote vehicle 120 illustrated in FIGS. 1A and 1B) and/or one or more remote computing devices via WiFi®, Bluetooth®, etc. In some embodiments, the shepherd vehicle is configured to transmit data to the autonomous vehicle. The data may include an identifier of the shepherd vehicle, instructions, and the like. In this way, the shepherd vehicle may provide identification and/or instructions to the autonomous vehicle. Additionally, or alternatively, the autonomous vehicle may transmit data (e.g., identification data, instructions, and the like), to the shepherd vehicle.

Figure 3:
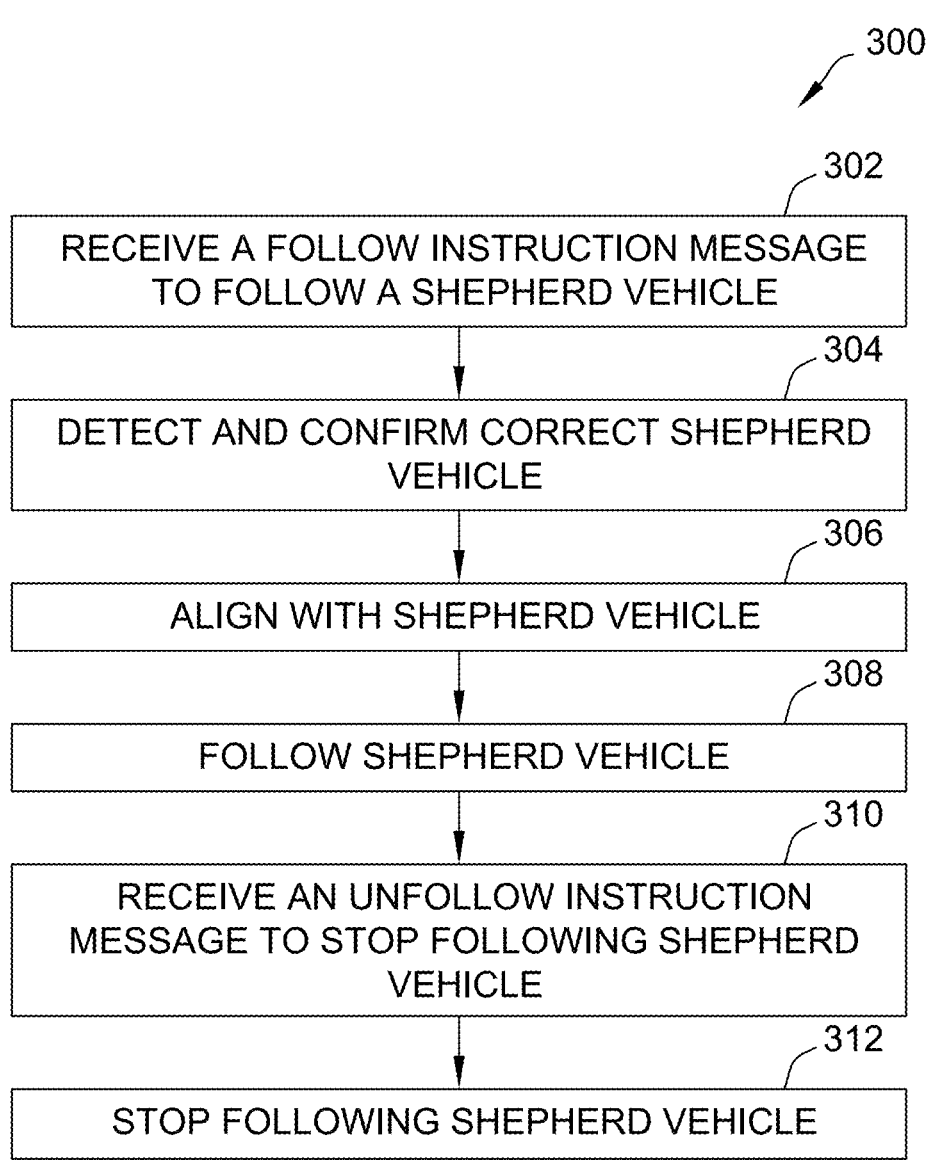
FIG. 3 is a flow diagram of a process for linking an autonomous vehicle to a remote vehicle, according to an embodiment of the present disclosure.

FIG. 3 is a flow diagram of a process 300 for wirelessly linking an autonomous vehicle to a shepherd vehicle. In process 300, it is not necessary for the autonomous vehicle to physically connect to the shepherd vehicle. Instead, the linking may be effected when the autonomous vehicle and the shepherd vehicle communicate wirelessly via various communication protocols (e.g., via WiFi®, Bluetooth®, etc.). The process may be executed by CPU 202 of autonomy computing system 200 (shown in FIG. 2).

At 302, upon entering a hub or other area, an autonomous vehicle (e.g., autonomous vehicle 100 shown in FIG. 1A) may receive a follow instruction message. In some embodiments, the follow instruction message is received from a control center. For example, in some embodiments, the follow instruction message is received from a remote computing device. In some embodiments, the remote computing device may be associated with a control center, such as a hub mission control center, which is responsible for hub operation, including tracking arrivals and departures from the hub. Additionally, or alternatively, the remote computing device may be associated with a mission control center, which manages an entire fleet of autonomous vehicles and/or a network of one or more transport hubs. The follow instruction message comprises an instruction to follow a shepherd vehicle (e.g., remote vehicle 120 shown in FIGS. 1A and 1B). More particularly, the follow instruction message includes instructions to follow a specific shepherd vehicle. For example, in some embodiments the instruction message may include one or more identifiers associated with a shepherd vehicle. The one or more identifiers may comprise a QR code, license plate number, symbol, RFID tag, a particular IR light pattern, a shape of the shepherd vehicle, and/or any other identifying element associated with one or more shepherd vehicles the autonomous vehicle may follow.

At 304, the autonomous vehicle detects the presence of the shepherd vehicle and confirms the shepherd vehicle is the correct shepherd vehicle. The presence of the shepherd vehicle may be detected by one or more sensors of the autonomous vehicle. The one or more sensors may comprise one or more cameras, one or more RFID readers, one or more receivers for any band in the EM spectrum, and/or any other receiver or reader. The autonomous vehicle may confirm it is the correct shepherd vehicle by comparing the one or more identifiers included in the follow instruction message with one or more identifiers of the shepherd vehicle.

At 306, after detecting the presence of the identified shepherd vehicle, the autonomous vehicle may align with the shepherd vehicle. Additionally, or alternatively, the shepherd vehicle aligns with the autonomous vehicle. The autonomous vehicle may determine the alignment of the shepherd vehicle using the one or more sensors of the autonomous vehicle. For example, in some embodiments, the shepherd vehicle comprises a plurality of QR codes, which the autonomous vehicle may detect using one or more cameras, and may determine the shepherd vehicle is aligned with the shepherd vehicle when it is able to read some or all of the plurality of QR codes. Additionally, or alternatively, the autonomous vehicle may detect the presence of and/or confirm alignment with the shepherd vehicle via wireless signals (e.g., WiFi®, Bluetooth®, etc.). In some embodiments, the shepherd vehicle may also detect the presence of the autonomous vehicle and/or confirm alignment with the autonomous vehicle using one or more sensors (e.g., camera, RFID reader, receiver for any band in the EM spectrum, etc.) and/or signals (e.g., WiFi®, Bluetooth®, etc.).

In some embodiments, the autonomous vehicle and the shepherd vehicle may exchange one or more signals to establish a communication link (e.g., perform a handshake). After establishing the communication link, the shepherd vehicle and the autonomous vehicle may communicate to confirm the correct shepherd vehicle has aligned with the autonomous vehicle and/or to confirm correct alignment. In some embodiments, the communication link may only be established if the shepherd vehicle is within a predefined distance of the autonomous vehicle.

Next, at 308, the autonomous vehicle begins following the shepherd vehicle. The autonomous vehicle may follow the shepherd vehicle using one or more sensors. For example, the autonomous vehicle may follow the shepherd vehicle using one or more cameras via a first tracking process 500 (shown in FIG. 5) and/or a second tracking process 600 (shown in FIG. 6), both of which are described in more detail below.

Once the autonomous vehicle has arrived at its intended destination, an unfollow instruction message is received at 310. In some embodiments, the unfollow instruction message is received by a remote computing device, such as a remote computing device associated with a control center of the hub. The unfollow instruction message causes the autonomous vehicle to stop following the shepherd vehicle at 312. In some embodiments, the unfollow instruction message further causes the autonomous vehicle to communicatively disconnect from shepherd vehicle.

In some embodiments, the disclosed system includes an autonomous vehicle that includes one or more coupling elements configured to couple with a shepherd vehicle. The coupling element may comprise a latch, magnet, a hook, a ring, and/or any other component configured to mechanically couple the autonomous vehicle to a shepherd vehicle. In some embodiments, when the autonomous vehicle and the shepherd vehicle are coupled, there may be a wired connection between them. The physical connection may be established by an automatic or manual process, as described in more detail below.

Figure 4:
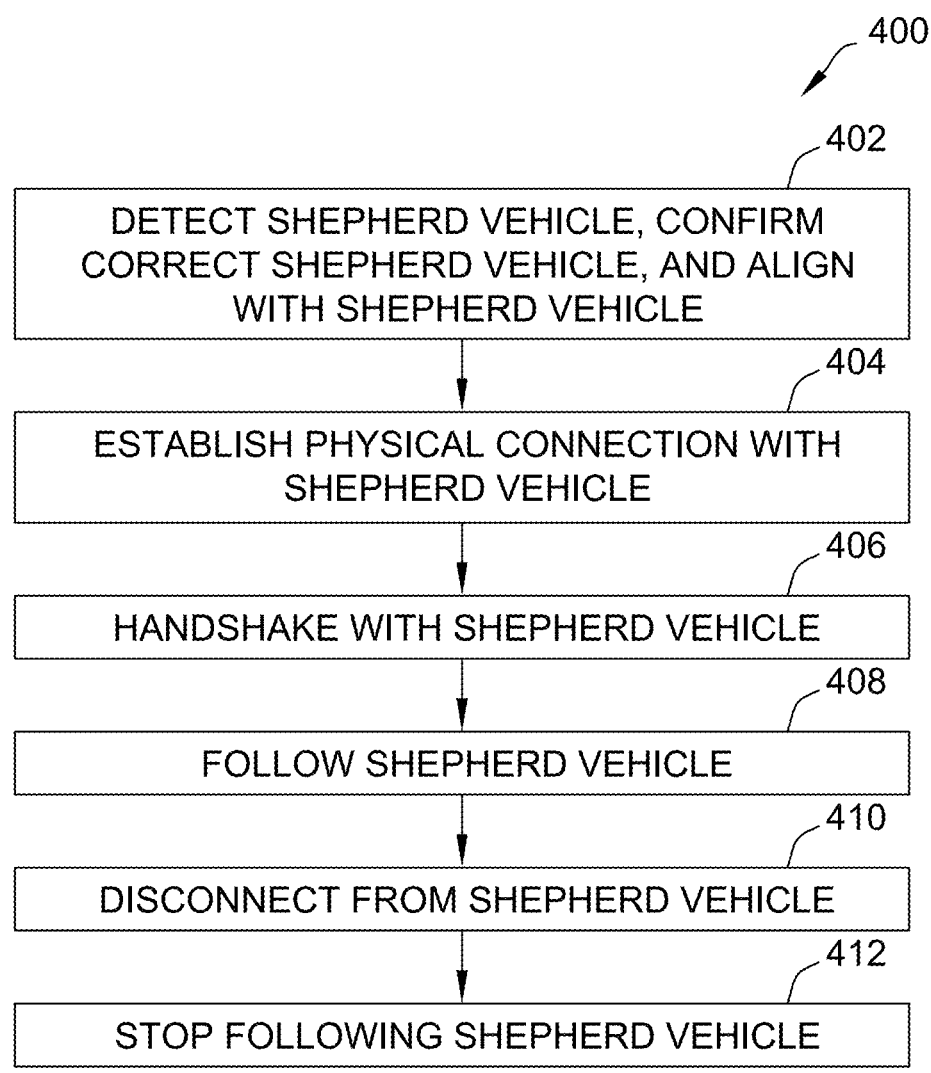
FIG. 4 is a flow diagram of a process for linking an autonomous vehicle to a remote vehicle, according to another embodiment of the present disclosure.

FIG. 4 is a flow diagram of a process 400 for linking an autonomous vehicle to a remote vehicle via a physical and/or wired connection. One or more steps of the process may be executed by CPU 202 of autonomy computing system 200 (shown in FIG. 2). At 402, the autonomous vehicle detects a shepherd vehicle, confirms it is the correct shepherd vehicle, and aligns with the shepherd vehicle and/or shepherd vehicle aligns with the autonomous vehicle, as discussed above. The autonomous vehicle may confirm it is the correct shepherd vehicle by comparing the one or more identifiers included in the follow instruction message with one or more identifiers of the shepherd vehicle. At 404, a physical connection with a shepherd vehicle is established. The physical connection may be comprise a latch, magnet, a hook, a ring, and the like, as discussed above. The physical connection may cause a wired connection between the autonomous vehicle and the shepherd vehicle. In some embodiments, the physical connection may be established automatically when an autonomous or semi-autonomous shepherd vehicle is aligned with the primary autonomous vehicle. In other embodiments, a physical connection may be established between the shepherd vehicle and the autonomous vehicle manually.

Once a physical connection is established, the autonomous vehicle and the shepherd vehicle exchange one or more signals to establish a communication link (e.g., perform a handshake) at 406. The handshake may be used to confirm that the autonomous vehicle is connected to the shepherd vehicle it was assigned to.

The autonomous vehicle may then begin following the shepherd vehicle at 408. In some embodiments, the autonomous vehicle and the shepherd vehicle may communicate via the physical, wired connection. In further embodiments, the autonomous vehicle may follow the shepherd vehicle via first tracking process 500 (shown in FIG. 5) and/or second tracking process 600 (shown in FIG. 6), both of which are described in more detail below. In other embodiments, after handshaking, the autonomous vehicle puts its transmission into neutral, and the autonomous vehicle is towed to its intended destination.

Once the autonomous vehicle has arrived at its intended destination, the autonomous vehicle may disconnect from the shepherd vehicle at 410 and stop following the shepherd vehicle at 412. The autonomous vehicle may then park in the hub, wait for travel instructions, leave the hub, and/or return to a mapped road as previously described in conjunction with process 300.

Figure 5:
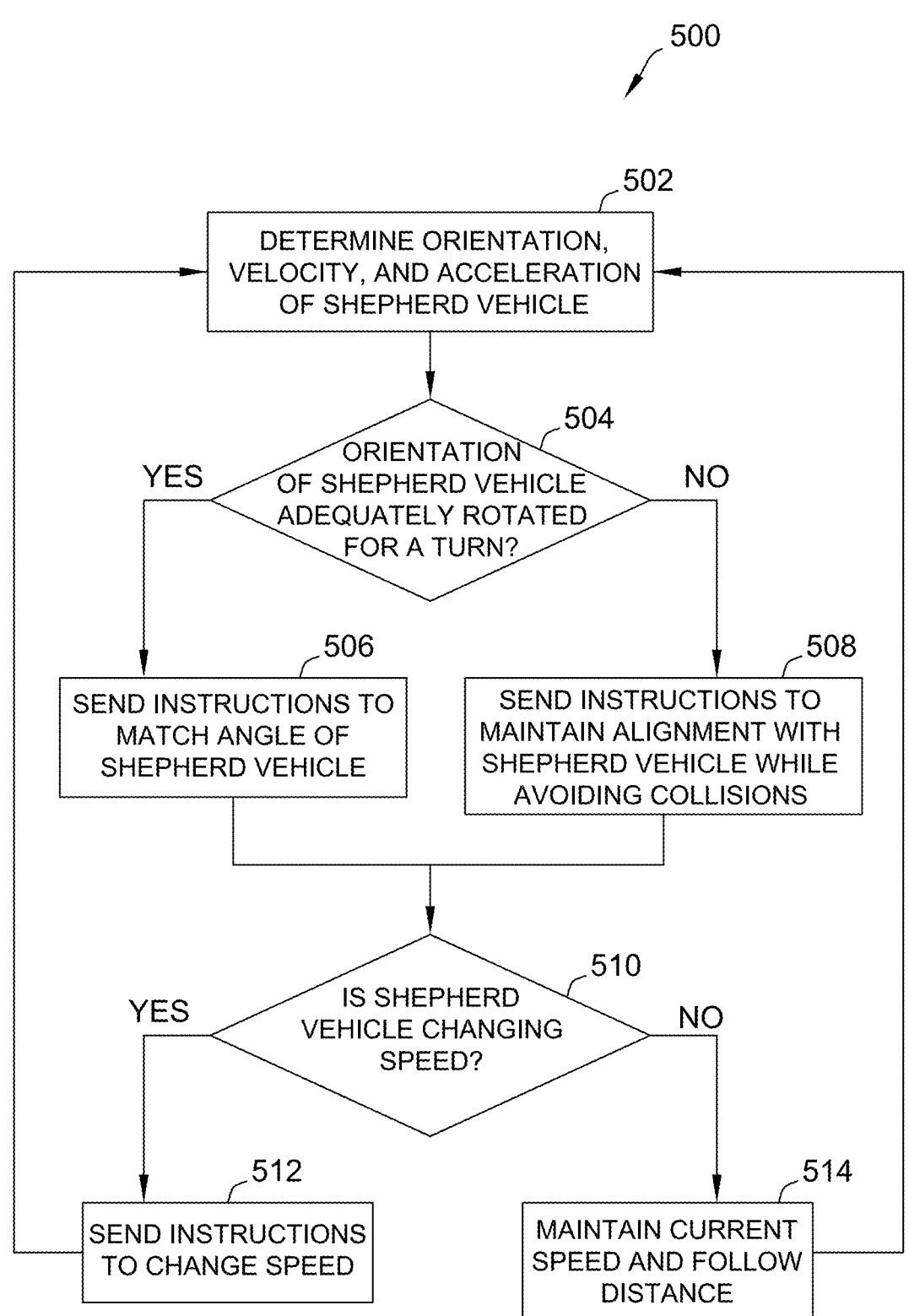
FIG. 5 is a flow diagram of a first tracking process, according to an embodiment of the present disclosure.

FIG. 5 is a flow diagram of first tracking process 500. In some embodiments, first tracking process 500 may be executed by autonomy computing system 200 (shown in FIG. 2). First tracking process 500 may be performed while the autonomous vehicle is following a shepherd vehicle (e.g., 308 in FIGS. 3 and 408 in FIG. 4).

At 502, the relative position, orientation, angular velocity, velocity, and/or acceleration of the shepherd vehicle is determined. The relative position, orientation, angular velocity, velocity, and/or acceleration may be determined, predicted, and/or propagated using data from one or more sensors, such as one or more cameras, LiDAR, RADAR, ultrasound sensors, etc. For example, relative position, orientation, angular velocity, velocity, and/or acceleration may be determined, predicted, and/or propagated using image and/or video data obtained from one or more cameras of the autonomous vehicle. At 504, it is determined whether the orientation of the shepherd vehicle is adequately rotated for a turn. This may be determined based on the image and/or video data from the one or more cameras. If the orientation of the shepherd vehicle is not adequately rotated for a turn at 504, the alignment may be adjusted to avoid collisions at 506. For example, autonomy computing system 200 may perform calculations to determine an alternative alignment to avoid collisions and may send instructions which cause the autonomous vehicle to maintain the alternative alignment. If the orientation of the shepherd vehicle is adequately rotated for a turn, the autonomous vehicle aligns with the orientation of the shepherd vehicle at 508. For example, autonomy computing system 200 (shown in FIG. 2) may carry out instructions which cause the autonomous vehicle to align with the orientation of the shepherd vehicle.

During first tracking process 500, it determined whether the shepherd vehicle is changing speed at 510. This may be determined via one or more sensors (e.g., cameras, LiDAR, RADAR, ultrasound sensors). If it is determined that the shepherd vehicle is changing speed, the autonomous vehicle changes its speed accordingly at 512 before returning to 502. If it is determined that the shepherd vehicle is not changing speed, the autonomous vehicle maintains its speed and a "follow distance" (e.g., a predefined distance from the shepherd vehicle) at 514. Further, in some embodiments, the autonomous vehicle is configured to maintain its orientation and avoid collisions at 514. Process 500 then returns to 502.

Figure 6:
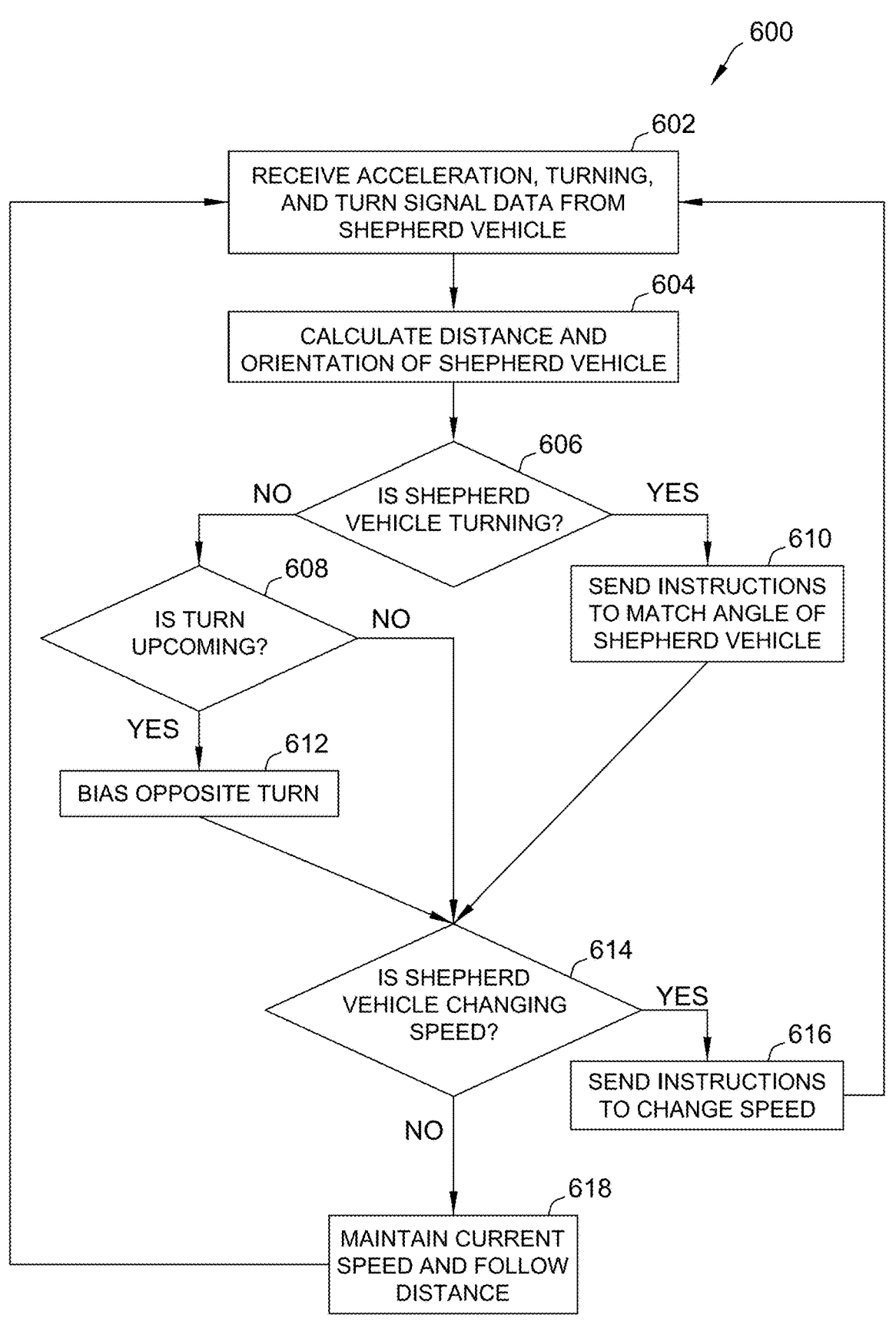
FIG. 6 is a flow diagram of a second tracking process, according to an embodiment of the present disclosure.

FIG. 6 is a flow diagram of second tracking process 600. In some embodiments, second tracking process 600 may be executed by autonomy computing system 200 (shown in FIG. 2). At 602, the autonomous vehicle may receive acceleration, turning, and turn signal data from the shepherd vehicle. The autonomous vehicle may receive this information via wired or wireless communication with the shepherd vehicle, as discussed above. At 604, the distance between the autonomous vehicle and the shepherd vehicle is calculated, as well as the orientation of the shepherd vehicle. Next, it is determined whether the shepherd vehicle is currently turning at 606. If the shepherd vehicle is not currently turning, it is determined whether there is an upcoming turn at 608. If it is determined there is an upcoming turn, the autonomous vehicle bias's opposite turn at 612. Additionally, or alternatively, the autonomous vehicle may decrease its speed.

If it is determined the shepherd vehicle is currently turning, the autonomous vehicle matches the turn at 610. For example, autonomy computing system 200 may carry out instructions which cause the autonomous vehicle to match the turn of the shepherd vehicle.

Next, at 614, it is determined whether the shepherd vehicle is changing speed, and if so, the autonomous vehicle changes its speed accordingly. For example, if it is determined that the shepherd vehicle is changing speed, the autonomous vehicle changes its speed accordingly at 616, before returning to 602. If it is determined that the shepherd vehicle is not changing speed, the autonomous vehicle maintains its speed and "follow distance" (e.g., a predefined distance from the shepherd vehicle) at 618. Further, in some embodiments, the autonomous vehicle is configured to maintain its orientation and avoid collisions at 618. Process 600 may then return to 602.

The systems and methods described herein offer several advantages in the field of autonomous vehicle technology. Currently, when a Level 4 autonomous vehicle enters a hub, station, or the like, assistance or intervention of a human driver or remote operator is required and therefore the autonomous vehicle goes out of autonomous mode and enters manual mode. By configuring the autonomous vehicle to follow a shepherd vehicle as described herein, the autonomous vehicle may remain in autonomous mode while travelling through a hub, without the autonomous vehicle needing to know the layout or other specialized data about the hub. This provides several advantages that will be apparent to those having ordinary skill in the art. First, hub details can remain with the hub, and therefore the hub layout may be modified and optimized without affecting incoming autonomous vehicles, regardless of owner, operator, and/or manufacturer. In addition, any errors in the autonomous driving system of the autonomous vehicle will become apparent earlier. More particularly, errors will become apparent after re-provisioning when leaving the hub. In contrast, when an autonomous vehicle is required to go into a manual mode while navigating a hub, an error in the autonomous driving system will only become apparent with the autonomous vehicle enters an autonomous mode, which typically occurs as the autonomous vehicle is exiting the hub. Detecting errors in the autonomous driving system while it is in the hub is advantageous, as these errors may be corrected in the relatively safe environment of the hub, thereby preventing delays, reducing costs, and improving safety. In addition, the autonomous vehicles do not have to be configured for human intervention (e.g., an autonomous truck would not require a cab with seating for humans).

Figure 7:
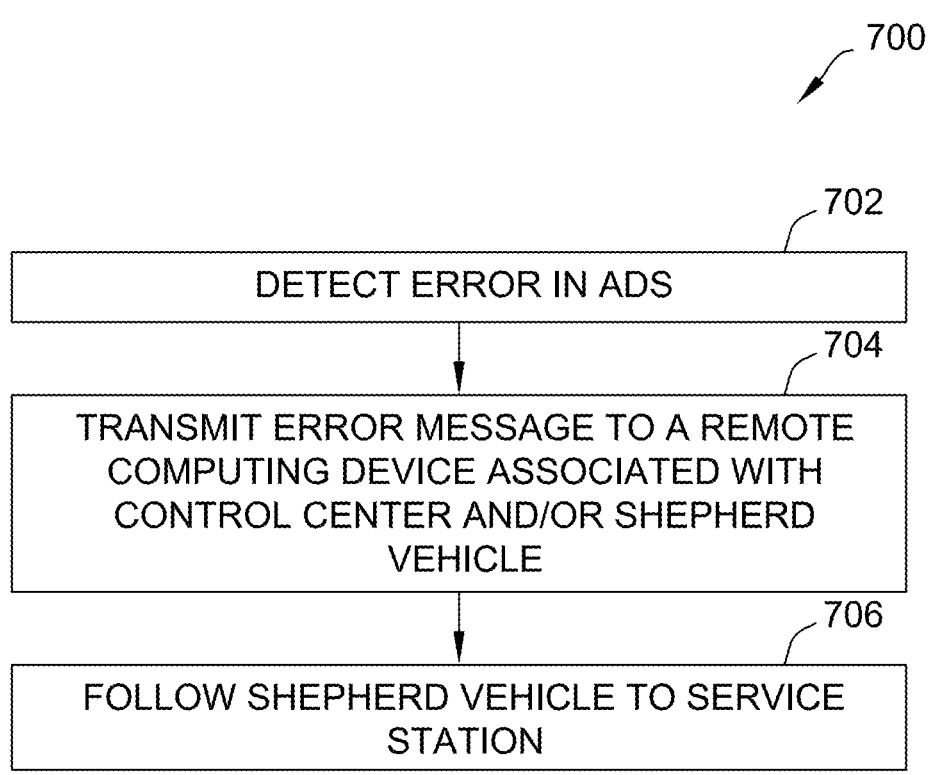
FIG. 7 is a flow diagram of an error detection process, according to an embodiment of the present disclosure.

FIG. 7 is a flow diagram of an error detection process 700. The error detection process 700 may be executed by autonomy computing system 200 (shown in FIG. 2). At 702, autonomy computing system 200 may detect an error. The error may be detected before the autonomous vehicle is physically and/or communicatively coupled to a shepherd vehicle (e.g., when the autonomous vehicle is traveling on a highway or other road) or may be detected while the autonomous vehicle is physically and/or communicatively coupled to a shepherd vehicle (e.g., when the autonomous vehicle is navigating through a hub). After an error has been detected and the autonomous vehicle has been physically and/or communicatively coupled to a shepherd vehicle, the autonomous vehicle transmits an error message to a remote computing device and/or the shepherd vehicle at 704. In some embodiments the remote computing device may be associated with a control center, such as a mission control of the hub. The control center may then instruct the shepherd vehicle, automatically or manually, to guide the autonomous vehicle to a service station or the like. The autonomous vehicle may then follow the shepherd vehicle to the service station at 706. The autonomous vehicle may follow the shepherd vehicle via one or more sensors (e.g., cameras, LiDAR, RADAR, ultrasound sensors, etc.). For example, the autonomous vehicle may follow the shepherd vehicle via first tracking process 500 (shown in FIG. 5) and/or second tracking process 600 (shown in FIG. 6). The autonomous vehicle may then be serviced at the service station in order to resolve the error in the autonomous driving system.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processors, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), directly in the hardware itself, or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory may include, but is not limited to, a non-transitory computer-readable medium, such as flash memory, a random-access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable, and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

We claim:

1. A computing system of an autonomous vehicle, the computing system including at least one processor in communication with at least one memory device and at least one sensor configured to receive signals from a remote vehicle, the at least one processor programmed to:

receive a follow instruction message from a remote computing device to follow a remote vehicle, the follow instruction message including at least one identifier, wherein the remote computing device is remote relative to the remote vehicle and the autonomous vehicle;

detect presence of the remote vehicle and confirm an identity of the remote vehicle by comparing the at least one identifier included in the follow instruction message with at least one identifier of the remote vehicle;

establish a communication link with the remote vehicle;

determine, based on a signal from the remote vehicle, that the remote vehicle is aligned with the autonomous vehicle; and in response to determining the remote vehicle is aligned with the autonomous vehicle, transmit one or more instructions which cause the autonomous vehicle to follow the remote vehicle.

2. The computing system of claim 1, wherein the at least one processor is further configured to confirm the remote vehicle is associated with the identifier included in the instruction message.

3. The computing system of claim 1, wherein the at least one processor is further configured to receive an unfollow instruction message, the unfollow instruction message including instructions to unfollow the remote vehicle.

4. The computing system of claim 1, wherein the at least one sensor comprises at least one of a camera, an acoustic sensor, a receiver for any band in the EM spectrum, or an RFID reader.

5. The computing system of claim 1, wherein the at least one processor is further configured to, while following the remote vehicle:

determine, based on data from the at least one sensor, at least one of an orientation, velocity, or acceleration of the remote vehicle;

determine whether an orientation of the remote vehicle is adequately rotated for a turn;

in response to determining the remote vehicle is adequately rotated for the turn, transmit instructions which cause the autonomous vehicle to maintain alignment with the remote vehicle; and in response to determining the remote vehicle is not adequately rotated for the turn, determine an alternative alignment and transmit instructions which cause the autonomous vehicle to maintain the alternative alignment.

6. The computing system of claim 5, wherein the at least one processor is further configured to, while following the remote vehicle:

determine whether the remote vehicle is changing speed;

in response to determining the remote vehicle is changing speed, send instructions which cause the autonomous vehicle to change speed accordingly; and in response to determining the remote vehicle is not changing speed, maintain current speed and distance from remote vehicle.

7. The computing system of claim 1, wherein the at least one processor is further configured to, while following the remote vehicle:

receive acceleration, turning, and turn signal data from remote vehicle;

calculate distance and orientation of remote vehicle;

determine whether remote vehicle is turning; and in response to determining shepherd vehicle is turning, send instructions which cause the autonomous vehicle to align with remote vehicle.

8. The computing system of claim 7, wherein the at least one processor is further configured to, while following the remote vehicle:

determine whether the remote vehicle is changing speed;

in response to determining the remote vehicle is changing speed, send instructions which cause the autonomous vehicle to reduce speed; and in response to determining the remote vehicle is not changing speed, maintain current speed and distance from remote vehicle.

9. The computing system of claim 1, wherein the at least one processor is further configured to, in response to detecting an error in an autonomous driving system of the autonomous vehicle, transmit an error message to a remote computing device associated with a control center.

10. The computing system of claim 1, wherein establishing a communication link with the remote vehicle comprises performing a handshake with the remote vehicle.

11. A computer-implemented method, the method being implemented via a computing system of an autonomous vehicle, the computing system including at least one processor and/or associated transceiver in communication with at least one memory device and at least one sensor, the method comprising:

receiving a follow instruction message from a remote computing device to follow a remote vehicle, the follow instruction message including at least one identifier of the remote vehicle, wherein the remote computing device is remote relative to the remote vehicle and the autonomous vehicle;

detecting presence of the remote vehicle and confirm an identity of the remote vehicle by comparing the at least one identifier included in the follow instruction message with at least one identifier of the remote vehicle;

establishing a communication link with the remote vehicle;

determining, based on a signal from the remote vehicle, that the remote vehicle is aligned with the autonomous vehicle; and in response to determining the remote vehicle is aligned with the autonomous vehicle, transmitting one or more instructions which cause the autonomous vehicle to follow the remote vehicle.

12. The computer-implemented method of claim 11, further comprising confirming the remote vehicle is associated with the identifier included in the instruction message.

13. The computer-implemented method of claim 11, further comprising receiving an unfollow instruction message, the unfollow instruction message including instructions to unfollow the remote vehicle.

14. The computer-implemented method of claim 11, further comprising establishing a communication link with the remote vehicle.

15. The computer-implemented method of claim 11, further comprising:

determining, based on data from the at least one sensor, at least one of an orientation, velocity, or acceleration of the remote vehicle;

determining whether an orientation of the remote vehicle is adequately rotated for a turn;

in response to determining the remote vehicle is adequately rotated for the turn, transmitting instructions which cause the autonomous vehicle to maintain alignment with the remote vehicle; and in response to determining the remote vehicle is not adequately rotated for the turn, determining an alternative alignment and transmit instructions which cause the autonomous vehicle to maintain the alternative alignment.

16. The computer-implemented method of claim 15, further comprising:

determining whether the remote vehicle is changing speed;

in response to determining the remote vehicle is changing speed, sending instructions which cause the autonomous vehicle to change speed accordingly; and in response to determining the remote vehicle is not changing speed, maintaining current speed and distance from remote vehicle.

17. The computer-implemented method of claim 11, further comprising:

receiving acceleration, turning, and turn signal data from remote vehicle;

calculating distance and orientation of remote vehicle;

determining whether remote vehicle is turning; and in response to determining shepherd vehicle is turning, send instructions which cause the autonomous vehicle to align with remote vehicle.

18. The computer-implemented method of claim 17, further comprising:

determining whether the remote vehicle is changing speed;

in response to determining the remote vehicle is changing speed, sending instructions which cause the autonomous vehicle to change speed accordingly; and in response to determining the remote vehicle is not changing speed, maintaining current speed and distance from remote vehicle.

19. The computer-implemented method of claim 11, further comprising, in response to detecting an error in an autonomous driving system of the autonomous vehicle, transmitting an error message to a remote computing device associated with a control center.

20. A non-transitory computer-readable storage media having computer-executable instructions embodied thereon, wherein when executed by at least one processor of an autonomous vehicle, the computer-executable instructions cause the at least one processor to:

receive a follow instruction message from a remote computing device to follow a remote vehicle, the follow instruction message including at least one identifier of the remote vehicle, wherein the remote computing device is remote relative to the remote vehicle and the autonomous vehicle;

detect presence of the remote vehicle and confirm an identity of the remote vehicle by comparing the at least one identifier included in the follow instruction message with at least one identifier of the remote vehicle;

establish a communication link with the remote vehicle;

determine, based on a signal from the remote vehicle, that the remote vehicle is aligned with the autonomous vehicle; and in response to determining the remote vehicle is aligned with the autonomous vehicle, transmit one or more instructions which cause the autonomous vehicle to follow the remote vehicle.

* * * * *